US012730623B2

(12) United States Patent
Hwangbo et al.

(10) Patent No.: US 12,730,623 B2
(45) Date of Patent: Sep. 8, 2026

(54) EXECUTION OF MEASURE COMMAND FOR FIRMWARE UPDATE AND FIRMWARE UPDATE

(71) Applicant: Hewlett-Packard Development Company, L.P., Spring, TX (US)

(72) Inventors: Joonhyung Hwangbo, Seongnam Si (KR); Jihoon Kim, Seongnam Si (KR); Hyunji Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 237 days.

(21) Appl. No.: 18/567,482

(22) PCT Filed: Nov. 24, 2021

(86) PCT No.: PCT/US2021/060701
§ 371 (c)(1),
(2) Date: Dec. 6, 2023

(87) PCT Pub. No.: WO2022/260697
PCT Pub. Date: Dec. 15, 2022

(65) Prior Publication Data

US 2024/0264822 A1 Aug. 8, 2024

(30) Foreign Application Priority Data

Jun. 9, 2021 (KR) ........................ 10-2021-0074793

(51) Int. Cl.

| | |
|---|---|
| ***G06F 9/445*** | (2018.01) |
| ***G06F 3/12*** | (2006.01) |
| ***G06F 8/65*** | (2018.01) |

(52) U.S. Cl.
CPC ............. *G06F 8/65* (2013.01); *G06F 3/1204* (2013.01); *G06F 3/123* (2013.01)

(58) Field of Classification Search
CPC ...... G06F 3/123; G06F 3/1204; G06F 3/1285; G06F 8/65; G06F 8/71; G06F 3/1288; G06F 8/70
See application file for complete search history.

(56) References Cited

U.S. PATENT DOCUMENTS

| | | | |
|---|---|---|---|
| 2003/0231336 | A1 | 12/2003 | Kim |
| 2004/0239975 | A1 | 12/2004 | Kawaura et al. |
| 2005/0158100 | A1 | 7/2005 | Yamaguchi et al. |
| 2007/0159650 | A1 | 7/2007 | Takamatsu et al. |

(Continued)

FOREIGN PATENT DOCUMENTS

| | | | |
|---|---|---|---|
| JP | 2006-235992 | A | 9/2006 |
| JP | 2009-154435 | A | 7/2009 |

(Continued)

*Primary Examiner* — Chuck O Kendall
(74) *Attorney, Agent, or Firm* — Foley & Lardner LLP

(57) ABSTRACT

An example firmware update method of an image forming apparatus includes receiving a command file including a measure command, a patch file, and a firmware file for firmware update, based on an automatic firmware update menu being selected, generating a command table including an execution order of the measure command based on the command file, and executing the measure command and updating the firmware based on the execution order of the measure command and a patch file related to the measure command.

14 Claims, 12 Drawing Sheets

(56) References Cited

U.S. PATENT DOCUMENTS

| | | | | |
|---|---|---|---|---|
| 2010/0241748 | A1 | 9/2010 | Ansari et al. | |
| 2017/0255456 | A1 | 9/2017 | Igarashi | |
| 2019/0034196 | A1 * | 1/2019 | Pirvu | G06F 8/65 |
| 2019/0147128 | A1 * | 5/2019 | O'Connor | G06N 20/00 703/11 |
| 2021/0374040 | A1 * | 12/2021 | Kumar | G06F 11/3688 |

FOREIGN PATENT DOCUMENTS

| | | | |
|---|---|---|---|
| JP | 2009-272933 | A | 11/2009 |
| JP | 2014-004805 | A | 1/2014 |

* cited by examiner

FIG. 3A

```
<?xml version="1.0" encoding="EUC-KR" ?>
<fw-update-cmd>
  <entry>
    <name>table1</name>
    <cmd>Update patch</cmd>  31
    <condition>PatchCheck.sk</condition>
    <retry>1</retry>
    <location>Booter</location>
    <run>
         <time>pre</time>
         <num>1</num>
    </run>
 </entry>
 <!- Next item-->
 <entry>
   <name>table2</name>
   <cmd>Clear_DB</cmd>  32
   <condition>CheckDB_Error.sh</condition>
   <retry>1</retry>
   <location>Kernel</location>
   <run>
         <time>pre</time>
         <num>1</num>
   </run>
 </entry>
 <!- Next item-->
 <entry>
   <name>table3</name>
   <cmd>Create new metafile</cmd>  33
   <arg>meta1234.txt</arg>
   <retry>1</retry>
   <location>App</location>
   <run>
         <time>post</time>
         <num>1</num>
   </run>
  </entry>
  <!- Next item-->
  <entry>
    <name>table4</name>
    <cmd>Delete patch</cmd>  34
    <arg>1-2-1-1</arg>
    <condition>UpdateCheck.sh</condition>
    <retry>1</retry>
    <location>App</location>
   <run>
         <time>post</time>
         <num>2</num>
   </run>
 </entry>
</ fw-update-cmd>
```

FIG. 3B

| | NUMBER | COMMAND | ARGUMENT | CONDITION | NUMBER OF TIMES OF EXECUTION | EXECUTION TIME | EXECUTION LOCATION |
|---|---|---|---|---|---|---|---|
| 31 | 1 | Update patch | Patch version | PatchCheck_sh | 1 | Pre-1 | APP |
| 32 | 2 | Clear_DB | N/A | CheckDB_Error.sh | 1 | Pre-1 | Kernel |
| 33 | 3 | Create new metafile | Metafile | N/A | 1 | Post-1 | APP |
| 34 | 4 | Delete Patch | Patch version | UpdateCheck.sh | 1 | Post-2 | APP |

FIG. 4A

| NUMBER | COMMAND | ARGUMENT | CONDITION | NUMBER OF TIMES OF EXECUTION | EXECUTION TIME | EXECUTION LOCATION |
|---|---|---|---|---|---|---|
| 1 | rm | Temp123.txt | File_exist.sh | 1 | Pre-1 | APP |

FIG. 4B

| NUMBER | COMMAND | ARGUMENT | CONDITION | NUMBER OF TIMES OF EXECUTION | EXECUTION TIME | EXECUTION LOCATION |
|---|---|---|---|---|---|---|
| 1 | rm | File_exist.sh | N/A | 1 | Pre-2 | APP |

FIG. 4C

| NUMBER | COMMAND | ARGUMENT | CONDITION | NUMBER OF TIMES OF EXECUTION | EXECUTION TIME | EXECUTION LOCATION |
|---|---|---|---|---|---|---|
| 1 | Clear_DB | N/A | CheckDB_Error.sh | 5 | Pre-1 | APP |
| 2 | Delete | Table1, Table2 | CheckDB_Error.sh | 5 | Pre-2 | APP |

EXECUTION OF MEASURE COMMAND FOR FIRMWARE UPDATE AND FIRMWARE UPDATE

BACKGROUND

An image forming apparatus may refer to an apparatus which prints print data generated by a terminal apparatus such as a computer on a print medium such as paper. Examples of such an image forming apparatus may include a copier, a printer, a facsimile, a multi-function peripheral (MFP) serving functions of these in combination as one apparatus, and the like.

BRIEF DESCRIPTION OF THE DRAWINGS

Various examples will be described below by referring to the following figures.

FIG. 3A is a diagram illustrating a command file according to an example;

FIG. 3B is a diagram illustrating a command table corresponding to the command file of FIG. 3A according to an example;

FIG. 4A is a diagram illustrating a command table including a preliminary measure command according to an example;

FIG. 4B is a diagram illustrating a command table including a delete command according to an example;

FIG. 4C is a diagram illustrating a command table including a repeated execution command according to an example;

DETAILED DESCRIPTION

Figure 1:
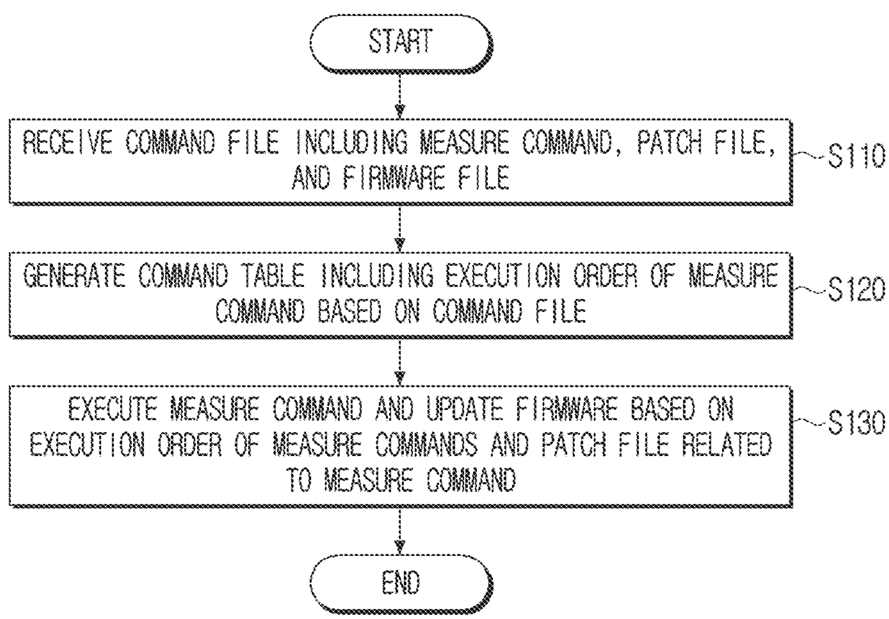
FIG. 1 is a flowchart illustrating a firmware update method according to an example.

Hereinafter, various examples will be described with reference to the drawings. The examples described hereinafter may be modified and practiced in various different aspects.

In the disclosure, the expression that a certain component is "connected" to another component includes a case where the components are "directly connected to each other", and also a case where the components are "connected to each other with another component interposed therebetween". In addition, in a situation in which a certain component "includes" another certain component, it indicates that a still another component may be further included, rather than excluding it, unless otherwise noted. Meanwhile, each example may be implemented or operated independently or the examples may also be implemented or operated in combination.

In the disclosure, an "image forming job" may refer to any of various jobs relating to an image such as forming of an image or generating, saving, or transmitting of an image file (e.g., copying, printing, scanning, or faxing), and the "job" may refer to the image forming job, and also refer to any process for performing the image forming job.

The term "print data" may refer to data converted into a format that is printable by a printer. If a printer supports direct printing, a file itself may be the print data.

The term "image forming apparatus" may refer to an apparatus which prints print data generated by a terminal apparatus such as a computer on a recording medium such as paper. Examples of such an image forming apparatus may include a copier, a printer, a facsimile, a scanner, and a multi-function peripheral (MFP) realizing functions of these as one apparatus in combination.

An "external apparatus" may refer to an apparatus which provides information or a service to an image forming apparatus via a network. For example, the external apparatus may be a server, a cloud, a web server, a host apparatus, a user terminal apparatus, etc.

A "user" may refer to a person who manipulates an electronic device by using an electronic apparatus or a device connected to an electronic apparatus in a wired or wireless manner. A "manager" may refer to a person who has authority to access all functions and system of the electronic apparatus. The "manager" and the "user" may be the same person.

A "measure command" may refer to an execution command included in a process of updating firmware of an image forming apparatus. For example, the "measure command" may include a command for updating the firmware, a command performed before the firmware update as a preliminary measure, a command performed after the firmware update as a post-measure, and the like. A "patch file" may refer to a file or an application used during a process of a general firmware update. A "firmware file" may refer to an update file for updating existing firmware. A "command file" may refer to a data file including a measure command, a patch file, and a firmware file.

Examples of the disclosure are made for an image forming apparatus to update a firmware by automatically performing a process.

FIG. 1 is a flowchart illustrating a firmware update method according to an example.

Referring to FIG. 1, an image forming apparatus may receive a command file including a measure command, a patch file, and a firmware file for a firmware update in operation S110. For example, the image forming apparatus may receive the command file from an external apparatus by using a wired or a wireless communication method. Alternatively, a removable memory storing a command file may be connected to the image forming apparatus, and the image forming apparatus may receive the command file stored in the removable memory. Based on the image forming apparatus receiving the command file, the image forming apparatus may temporarily store the input command file in the memory. In an example, the command file may be a file in an extensible Markup Language (XML) format, but is not limited thereto.

The image forming apparatus may generate a command table including an execution order of the measure command based on the command file in operation S120. Based on the image forming apparatus receiving an automatic firmware update command from the user, the image forming apparatus may divide the measure command, the patch file, and the firmware file from the input command file. In addition, the image forming apparatus may parse the divided measure command, patch file, and firmware file and generate a command table. For example, the command table may include information such as a measure command, an execution order of commands, a patch file related to a specific command, an execution condition, a number of times of execution, an execution time, an execution location, and the like. In other words, the image forming apparatus may generate the command table including items such as the related patch file, the execution condition, the number of times of execution, the execution time, the execution location, and the like, along with the item of the execution order of measure commands, based on the input command file.

For example, the execution condition may be a condition for executing the measure command. The number of times of execution may be a number of times that the measure command is executed. The execution time may be before or after the firmware update. In an example, the measure command executed before the firmware update may be referred to as a preliminary measure command, and the measure command executed after the firmware update may be referred to as a post-measure command. The execution location may refer to a location where the measure command is executed, and the execution location may include an area of a booter, a kernel, or an application.

The image forming apparatus may perform the firmware update process while executing the measure command according to the execution order of the generated command table. For example, if the command table includes a preliminary measure command executed before the firmware update, the image forming apparatus may execute the preliminary measure command first before performing the firmware update. The image forming apparatus may execute the preliminary measure command based on the preliminary measure command included in the command table and the patch file related to the preliminary measure command.

For example, the preliminary measure command may include a database (DB) problem solution command.

The image forming apparatus may execute the measure command and update the firmware based on the execution order of the measure commands and the patch file related to the measure command in operation S130. The image forming apparatus may execute the preliminary measure command before the firmware update based on the command table. For example, if the preliminary measure command is a DB clear command, the image forming apparatus may perform a DB clear process based on the DB clear command. As described above, the command table may include the command item and the item of the number of times of execution. If the number of times of execution of the DB clear command included in the command table is more than one, the image forming apparatus may execute the DB clear command a plural number of times based on the command table. The image forming apparatus may reduce the number of times of execution included in the command table by one, each time that the DB clear command is executed. In addition, the image forming apparatus may execute the DB clear command repeatedly until the number of times of execution of the DB clear command becomes 0. For example, if the number of times of execution of the DB clear process included in the command table is more than one, the image forming apparatus may reduce the number of times of execution of the DB clear process by one, each time that the DB clear process is executed, and perform the DB clear process repeatedly until the number of times of execution of the DB clear process becomes 0. The above process may be performed in the same manner based on executing the post-measure command. In other words, if the number of times of execution of the post-measure command included in the command table is more than one, the image forming apparatus may reduce the number of times of execution of the post-measure command by one, each time that the post-measure command is executed, and execute the post-measure command repeatedly until the number of times of execution of the post-measure command becomes 0.

Based on the number of times of execution of the DB clear command becoming 0, the image forming apparatus may end the execution process of the DB clear command. Based on the DB clear process being completed, the image forming apparatus may delete the item related to the DB clear command included in the command table. The above process may be performed in the same manner in a situation of executing the post-measure command. In other words, based on the execution of post-measure command being completed, the image forming apparatus may delete the item related to the post-measure command included in the command table. Accordingly, the image forming apparatus may prevent unnecessary repetition of the completed command.

Alternatively, the preliminary measure command may refer to a DB-related patch file update command. Based on the preliminary measure command being the DB-related patch file update command, the image forming apparatus may update a DB-related patch file based on the DB-related patch file update command. The DB-related patch file may be included in the command file input to the image forming apparatus. Based on the preliminary measure command being the DB-related patch file update command, the image forming apparatus may update an existing DB-related patch file based on the DB-related patch file update command and the DB-related patch file. Based on the DB-related patch file update being completed, the image forming apparatus may delete the DB-related patch file. The above process may be performed in the same manner in a situation in which the post-measure command is executed. In other words, based on the execution of the post-measure command being completed, the image forming apparatus may delete the patch file related to the post-measure command.

The image forming apparatus may execute the preliminary measure command based on the command table. Based on the execution of the preliminary measure command being completed, the image forming apparatus may update the firmware. The command table may include the post-measure command to be executed after performing the firmware update. The image forming apparatus may confirm the post-measure command to be executed after the firmware update based on the execution time included in the command table. In addition, the image forming apparatus may execute the post-measure command based on the command table.

In an example, the post-measure command may be a serial number digit change command. If the post-measure command is the serial number digit change command, the image forming apparatus may temporarily store an existing serial number and store a new serial number as a serial number of the image forming apparatus. Based on the image forming apparatus completing all post-measure commands based on the command table, the automatic firmware update process of the image forming apparatus may end.

In an example, the firmware update menu may include a general update item, in addition to the automatic firmware update item described above. If the user selects the automatic firmware update item, the image forming apparatus may automatically perform the firmware update process through the above process.

Based on the general firmware update menu being selected, the image forming apparatus may delete the measure command and the patch file included in the command file and parse the firmware file without parsing other files. The image forming apparatus may update the firmware of the image forming apparatus based on the firmware file parsed according to the user's command.

Figure 2:
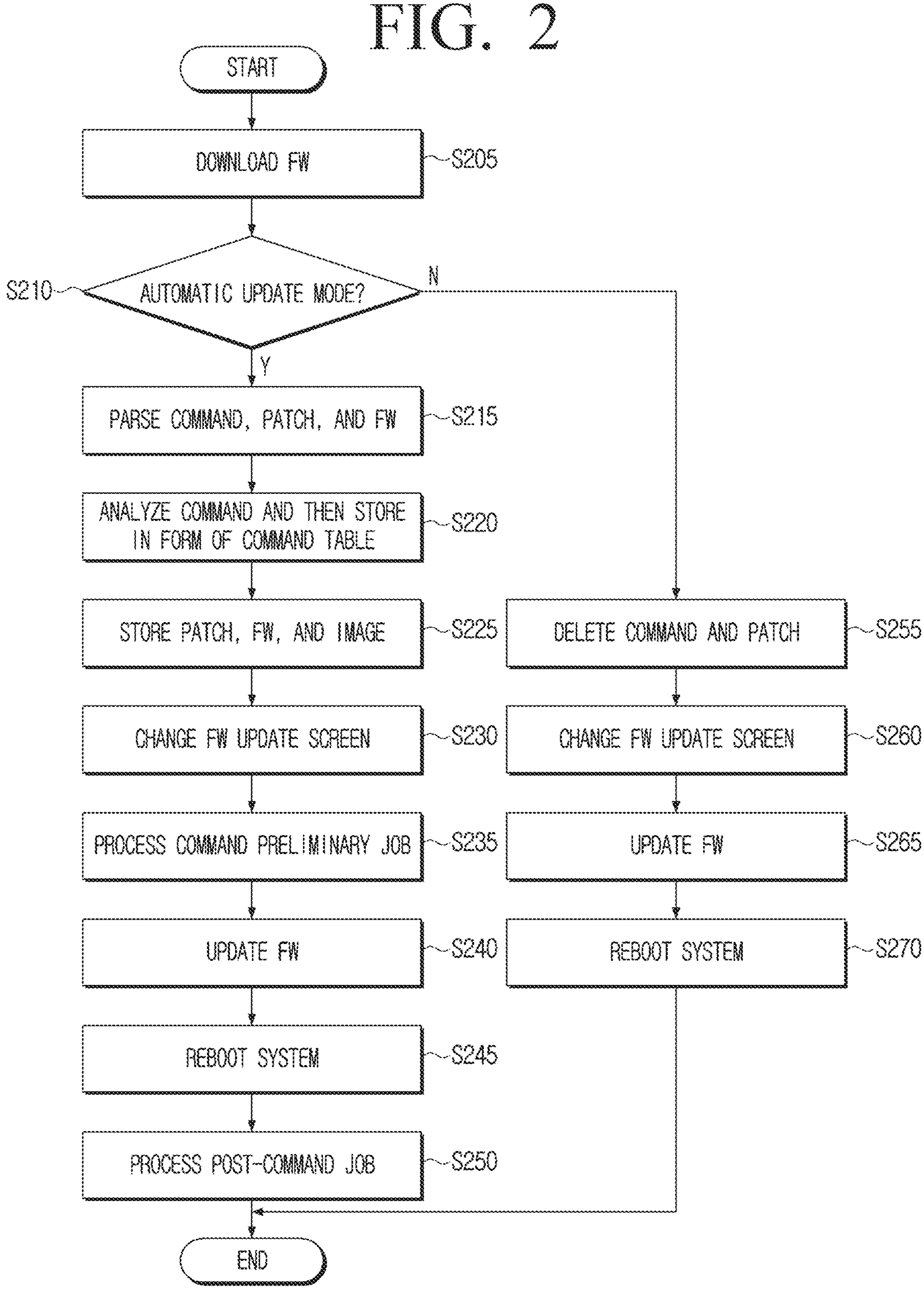
FIG. 2 is a flowchart illustrating a firmware update method according to an example.

FIG. 2 is a flowchart illustrating a firmware update method according to an example.

Referring to FIG. 2, the image forming apparatus may download a firmware file in operation S205. As an example, based on the firmware update process being selected by the user, the image forming apparatus may receive the firmware file. The firmware file may be included in the command file along with the measure command and the patch file. The command file may be input to the image forming apparatus from an external apparatus via a wired or wireless communication method or may be stored in a removable memory and input to the image forming apparatus from the removable memory. The command file input to the image forming apparatus may be temporarily stored in a memory of the image forming apparatus.

The image forming apparatus may receive a selection of whether to automatically update in operation S210. For example, the image forming apparatus may display a menu for selecting an automatic firmware update mode or a general update mode. In addition, the image forming apparatus may update the firmware automatically according to the user's selection, or update the firmware by a general method by the user. If the automatic firmware update mode is selected in operation S210-Y, the image forming apparatus may parse the measure command, the patch file, and the firmware file in operation S215. In addition, the image forming apparatus may analyze the measure command, store the analyzed measure command in the command table in operation S220, and store a patch file and a firmware image (file) in operation S225. The image forming apparatus may change a screen to a firmware update screen in operation S230. For example, the command table may include items such as a measure command, an execution order of measure commands, a patch file related to a specific measure command, an execution condition, a number of times of execution, an execution time, an execution location, and the like. The image forming apparatus may execute the measure command sequentially according to the execution order included in the command table.

The measure command included in the command table may include a preliminary measure command to be executed before the firmware update or a post-measure command to be executed after the firmware update. Based on the command table including the preliminary measure command, the image forming apparatus may output a guide message indicating the processing of the preliminary measure command and process a command preliminary job in operation S235. The image forming apparatus may execute the preliminary measure command with reference to the execution location, the execution condition, the related patch file, and the like of the command table. If the number of times of execution is more than one, the image forming apparatus may execute the corresponding preliminary measure command several times. If the command table includes a plurality of preliminary measure commands, the image forming apparatus may execute the plurality of preliminary measure commands sequentially according to the execution order.

Based on the execution of the preliminary measure command being completed, the image forming apparatus may update the firmware in operation S240. The image forming apparatus may change the guide message indicating the processing of the preliminary measure command to a guide message indicating the firmware update and output the guide message, and perform the firmware update process. Based on the firmware update being completed, the image forming apparatus may reboot the system (image forming apparatus) in order to apply a new firmware in operation S245.

Based on the system rebooting being completed, the image forming apparatus may process a post-command job according to the execution order of the command table in operation S250. Based on a booter firmware part being operated, the image forming apparatus may detect whether the post-measure command to be post-processed in the booter firmware is included in the measure commands included in the command table. If the post-measure command to be post-processed in the booter firmware is included, the image forming apparatus may output a guide message indicating the processing of the post-measure command and perform a post-processing job of a booter area. The image forming apparatus may detect whether the post-measure command to be additionally processed in a kernel area or an application area is included in the command table. If the post-measure command to be post-processed in the kernel area or the application area is included, the image forming apparatus may perform the post-processing job of the kernel area or the application area. Based on the post-processing job being completed, the image forming apparatus may output a guide message indicating the completion of update, and end the update process regarding the firmware.

If the general firmware update mode is selected in operation S210-N, the image forming apparatus may delete the measure command and the patch file from the command file that is temporarily stored in operation S255. The image forming apparatus may change a screen to the firmware update screen in operation S260 and update the firmware according to the control of the user in operation S265. The image forming apparatus may output a guide message indicating the firmware update and perform the firmware update process. Based on the firmware update being completed, the image forming apparatus may reboot the system in order to apply a new firmware in operation S270. The image forming apparatus may output a guide message indicating the completion of update, and end the update process regarding the firmware.

Hereinabove, an example method for an image forming apparatus to update firmware has been described. Hereinafter, an example command file and command table will be described.

FIG. 3A is a diagram illustrating a command file according to an example and FIG. 3B is a diagram illustrating a command table corresponding to the command file of FIG. 3A according to an example.

Referring to FIG. 3A, a command file in an XML format is illustrated. For example, the command file may be in the XML format. The image forming apparatus may receive the command file in the XML format, identify a command included in the command file by using an XML parser, and generate a command table. However, the command file is not necessarily in the XML format. The format of the command file may be any format, as long as it is a format predetermined with the parser of the image forming apparatus.

Referring to FIG. 3A, the command file may include information such as measure commands 31, 32, 33, and 34, a patch file related to each measure command, an execution condition of each measure command, a number of times of execution, an execution time, an execution location, and the like. The image forming apparatus may analyze the command files and generate the command table.

Referring to FIG. 3B, a command table generated based on the command files of FIG. 3A is illustrated. The image forming apparatus may generate the command table based on information such as the measure command included in the command file. In an example, the image forming apparatus may generate items of the update patch command 31 firstly included in the command file. The items of the update patch command 31 may include information such as an argument (e.g., patch file), a condition, a number of times of execution, an execution time, an execution location, and the like regarding the update patch command 31 based on the information of the command file. The image forming apparatus may generate items regarding the Clear_DB command 32, the Create new metafile command 33, and the Delete Patch command 34 in the command table by substantially the same method. The image forming apparatus may perform the firmware update process of the image forming apparatus including the preliminary job and the post-job according to the measure command of the generated command table.

FIG. 4A is a diagram illustrating a command table including a preliminary measure command according to an example, FIG. 4B is a diagram illustrating a command table including a delete command according to an example, and FIG. 4C is a diagram illustrating a command table including a repeated execution command according to an example.

Referring to FIG. 4A, the command table may include an rm command. The execution time of the rm command is pre which indicates a preliminary measure command to be processed before the firmware update, the number of times of execution is 1 which indicates a command to be executed once, and the execution location is app which indicates a command to be executed in an application area. In addition, the rm command may be a command for checking whether there is Temp123.txt file to be deleted through File_exist.sh with reference to the execution condition and argument. Accordingly, the image forming apparatus may check whether there is a Temp123.txt file to be deleted through File_exist.sh before performing the firmware update, and if there is the Temp123.txt file, the image forming apparatus may delete the Temp123.txt file by executing the rm command in the application area in a form of rm Temp123.txt. The image forming apparatus may execute the rm command and reduce the number of times of execution by one. Based on the number of times of execution becoming 0, the image forming apparatus may delete the items of the rm command from the command table. The rm command which is the execution file and the File_exist.sh file which is a condition check script may be an execution file or a script previously included in the image forming apparatus. Alternatively, the execution file or the script may be included in the command file in a patch form and input to the image forming apparatus.

In a situation in which the execution file or the script is not to exist due to security or the like, the execution file or the script may be deleted by using a patch file deletion command included in the command table. For example, if File_exist.sh is a file to be deleted, the command table may include a command for deleting File_exist.sh. Referring to FIG. 4B, the image forming apparatus may execute the rm command with reference to the command table. In other words, the image forming apparatus may delete File_exist.sh by executing the rm command once in the application area in a form of rm File_exist.sh before the firmware update.

In addition, the command table may include the measure command repeatedly executed. Referring to FIG. 4C, the command table may include a Clear_DB command and a Delete command repeatedly performed five times. In an example, the image forming apparatus may execute a Clear_DB command if necessary by executing CheckDB_Error.sh before the firmware update. The image forming apparatus may confirm whether the DB is in a clear state by executing CheckDB_Error.sh again by using the Delete command. If the DB is in a clear state, the image forming apparatus may delete a first table and a second table at the same time. For example, if the DB error is continued, the image forming apparatus may retry the execution of the Clear_DB command and the Delete command up to five times finally.

Figure 5A:
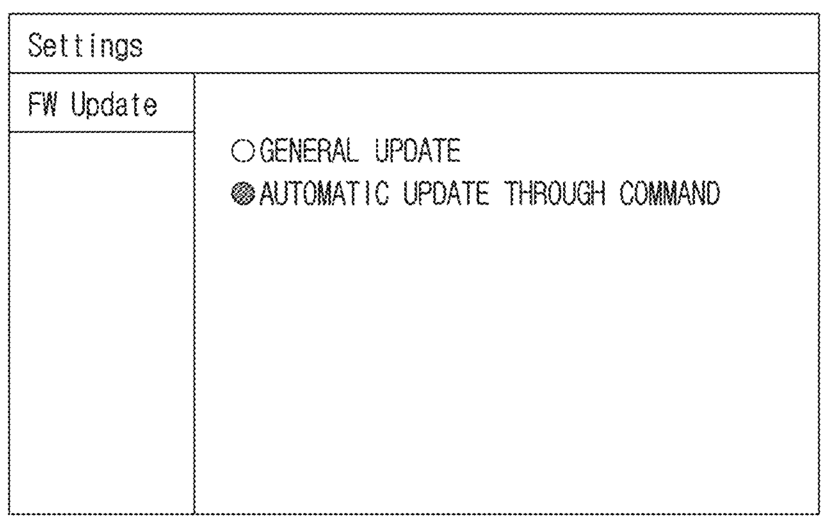
FIG. 5A is a diagram illustrating a firmware update menu according to an example.

FIG. 5A is a diagram illustrating a firmware update menu according to an example.

Referring to FIG. 5A, the image forming apparatus may update the firmware by one of a general method of firmware update or an automatic method of firmware update. The image forming apparatus may output a menu for selecting the general firmware update mode or the automatic firmware update mode. If the automatic firmware update mode is selected from the output menu, the image forming apparatus may generate the command table based on the input command file. In addition, the image forming apparatus may automatically perform the firmware update process including the preliminary job and the post-job based on the generated command table.

Figure 5B:
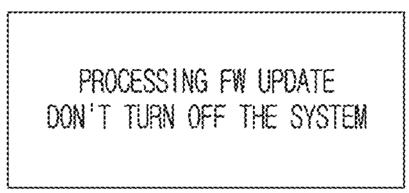
FIG. 5B is a diagram illustrating a guide message indicating a firmware update progress state according to an example.

FIG. 5B is a diagram illustrating a guide message indicating a firmware update progress state according to an example.

Referring to FIG. 5B, the image forming apparatus may output a guide message related to a progress of a process to the user in a situation in which the firmware update process proceeds. Based on the firmware update process proceeding, the image forming apparatus may output a guide message indicating the firmware update progress, a warning message not to power down the system, and the like. In addition, in a case in which the patch update process proceeds, the image forming apparatus may output a guide message indicating the patch update progress, and, in a case in which the preliminary or post-job is performed, the image forming apparatus may output a guide message indicating a system measure process.

Figure 6:
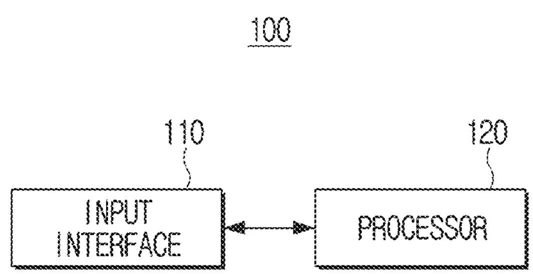
FIG. 6 is a diagram illustrating an image forming apparatus according to an example.

FIG. 6 is a diagram illustrating an image forming apparatus according to an example.

Referring to FIG. 6, an image forming apparatus 100 may include an input interface 110 and a processor 120.

The input interface 110 may receive an input of a function selection and a control command for the corresponding function from the user. As an example, the input interface 110 may receive a command file. For example, the command file may include a measure command, a patch file, and a firmware file. The input interface 110 may be implemented as an input port or the like. The input interface 110 implemented as an input port or the like may be connected to a removable memory storing the command file and may receive the command file from the connected removable memory or the like. Alternatively, the input interface 110 may be implemented as a communication interface. The input interface 110 implemented as the communication interface may receive the command file from an external apparatus by a wired or wireless communication method.

In addition, the input interface 110 may receive an input of a command for selecting among the general update mode or the automatic update mode regarding the firmware update from the user. For example, the input interface 110 may be implemented as a keyboard, a keypad, a touch pad, a touch screen, or the like. The input interface 110 may be referred to as an input unit, an input module, an input device, or an input and output unit.

The processor 120 may control an operation of the image forming apparatus 100. The processor 120 may update the firmware of the image forming apparatus 100 based on the selected update mode. Based on the general update mode being selected, the processor 120 may delete the measure command and the patch file included in the command file, and update the firmware of the image forming apparatus 100 based on the firmware file.

Based on the automatic update mode being selected, the processor 120 may generate a command table including the execution order of the measure command based on the command file. In an example, the command table may include items of the execution order of the measure command, items of the related patch file, the execution condition, the number of times of execution, the execution time, the execution location, and the like. In an example, the execution location may include areas of a booter, a kernel, and an application. The command table may include a preliminary measure command to be executed before performing the firmware update process.

In an example, the preliminary measure command may include a DB problem solution command. Based on the command table including the DB problem solution command, the processor 120 may execute the DB problem solution command based on the execution order of the measure command and the DB-related patch file. If the DB problem solution command is a DB clear command, the processor 120 may perform the DB clear process based on the command table. If the number of times of execution of the DB clear process included in the command table is more than one, the processor 120 may reduce the number of times of execution of the DB clear process by one, each time the DB clear process is performed, and perform the DB clear process repeatedly until the number of times of DB clear process becomes 0. Based on the DB clear process being completed, the processor 120 may delete the item related to the DB clear command included in the command table so that the completed command is not unnecessarily executed.

In an example, the preliminary measure command may include the DB-related patch file update command. If the command table includes the DB-related patch file update command, the processor 120 may update the existing DB-related patch file based on the DB-related patch file update command and the DB-related patch file. Based on the DB-related patch file update being completed, the processor 120 may delete the DB-related patch file.

Based on all of the preliminary measure commands included in the command table being executed, the processor 120 may update the firmware of the image forming apparatus based on the command execution order of the command table. In an example, the command table may include the post-measure command to be executed after executing the firmware update process.

Based on the update of the firmware being completed, the processor 120 may confirm the post-measure command included in the command table. Based on the command table including the post-measure command, the processor 120 may update the firmware of the image forming apparatus and then execute the post-measure command based on the command table.

In an example, the post-measure command may include the serial number digit change command. If the post-measure command is the serial number digit change command, the processor 120 may temporarily store an existing serial number. Then, the processor 120 may store a new serial number as the serial number of the image forming apparatus.

Figure 7:
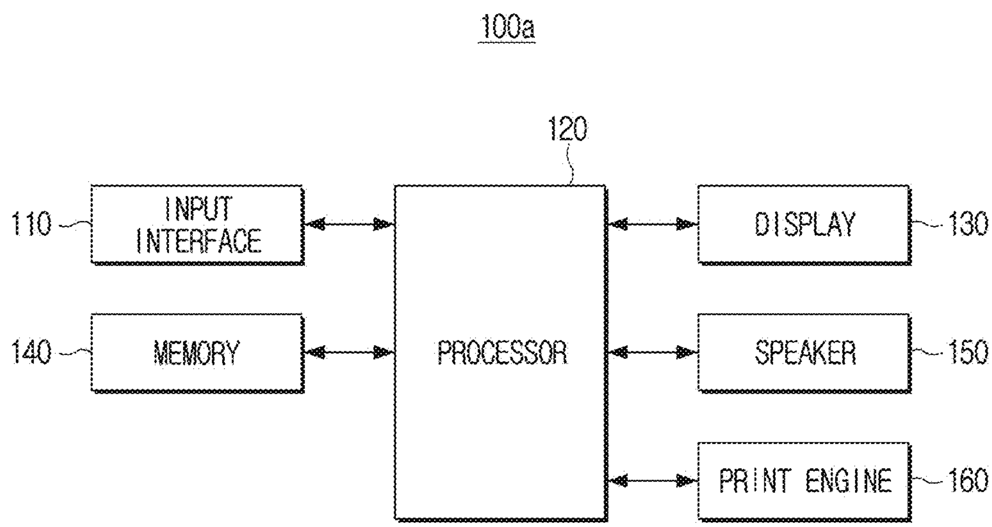
FIG. 7 is a diagram illustrating an image forming apparatus according to an example.

FIG. 7 is a diagram illustrating an image forming apparatus according to an example.

Referring to FIG. 7, an image forming apparatus **100*a* may include the input interface 110, the processor 120, a display 130, a memory 140, a speaker 150, and a print engine 160. The input interface 110 performs the same function as the input interface 110 of FIG. 6 and therefore the overlapped description will not be repeated. In addition, since the processor 120 performs the similar functions as the processor 120 of FIG. 6, the overlapped description described in FIG. 6 will not be repeated and content related to the configuration added to FIG. 7** will be described below.

The display 130 may display an execution screen and a user interface window of an application program. For example, the display 130 may display a menu for selecting the firmware update method by the control of the processor 120. In an example, the display 130 may display a menu for selecting the general firmware update mode or the automatic firmware update mode. In addition, the display 130 may display a guide message for informing the user the progress process by the control of the processor 120. In an example, the display 130 may display a guide message indicating the processing of the preliminary measure command according to the firmware update progress process, a guide message indicating the firmware update, a guide message indicating the processing of the post-measure command, a guide message indicating the firmware update completion, and the like. The display 130 may be implemented as a liquid crystal display (LCD), a cathode ray tube (CRT), a light emitting diode (LED), an organic LED (OLED), a flexible display, or the like, and may also be implemented as a touch screen capable of simultaneously performing the function of the input interface 110.

The memory 140 may store at least one instruction for the image forming apparatus **100*a*. For example, the memory 140 may store various programs (e.g., machine readable instructions) for the image forming apparatus 100*a* to operate according to various examples of the disclosure. In addition, the memory 140** may store the input command file, the generated command table, the parsed patch file, the parsed firmware file, and the like.

The speaker 150 may output state information of the image forming apparatus **100*a* as a sound. For example, if the image forming apparatus 100*a* is in an error state, the speaker 150 may output a sound corresponding to the error state. Alternatively, the speaker 150** may output a guide message indicating the firmware update progress process as a sound.

The print engine 160 may form an image. As an example, the print engine 160 may print a print image generated by the processor 120 on a print paper. The print engine 160 may perform printing by electrophotography or may perform printing by an ink jet method. In addition, the print engine 160 may be a monochrome print engine capable of printing in one color or may be a color print engine capable of color printing.

Figure 8:
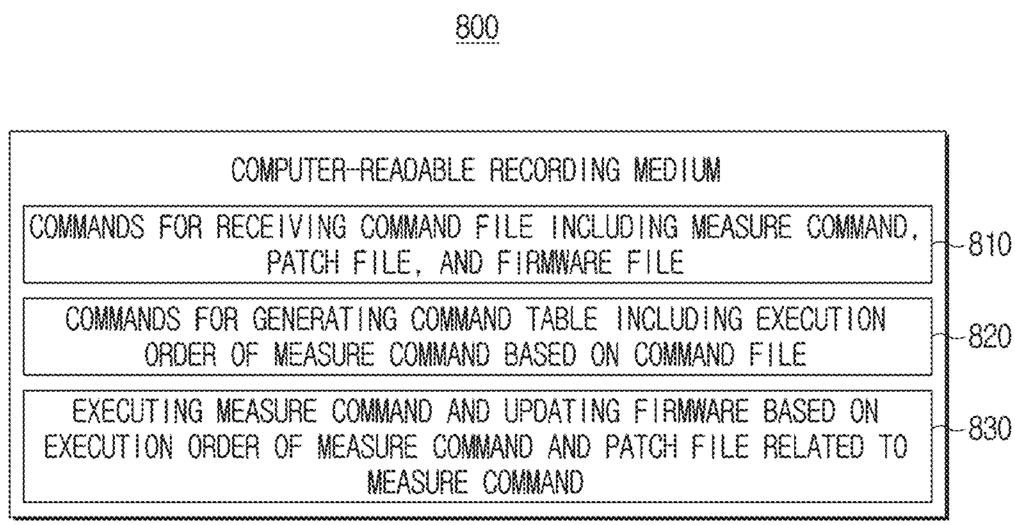
FIG. 8 is a diagram illustrating commands stored in a non-transitory computer-readable recording medium according to an example.

FIG. 8 is a diagram illustrating commands stored in a non-transitory computer-readable recording medium according to an example.

Referring to FIG. 8, the example firmware update process performed on an image forming apparatus described above, may be implemented in a form of a non-transitory computer-readable recording medium storing a command or data executable by a computer or a processor. A non-transitory computer-readable recording medium 800 may store commands (i.e., instructions) related to example operations of the image forming apparatus described above. For example, the non-transitory computer-readable recording medium 800 may include commands 810 for receiving a command file including a measure command, a patch file, and a firmware file for firmware update, commands 820 for generating a command table including an execution order of the measure command based on the command file, and commands 830 for executing the measure command and updating the firmware based on the execution order of the measure command and the patch file related to the measure command.

Such a non-transitory computer-readable recording medium may be a read-only memory (ROM), a random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk drive, a solid-state drive (SSD), and any device capable of storing machine readable instructions, related data, data files, and data structures, and providing machine readable instructions, related data, data files, and data structures to a processor or a computer so that the processor or the computer executes the instructions.

While examples of the disclosure have been shown and described, the disclosure is not limited to the aforementioned examples, and it is apparent that various modifications can be made without departing from the gist of the disclosure as claimed by the appended claims. Also, it is intended that such modifications are not to be interpreted independently from the technical idea or prospect of the disclosure.

What is claimed is:

1. A firmware update method of an image forming apparatus, the method comprising:

receiving a command file input from an external apparatus comprising a measure command, a patch file, and a firmware file for firmware update;

receiving a selection via a menu of whether to automatically update firmware for the image forming apparatus;

based on the automatic firmware update menu being selected, generating a command table including an execution order of the measure command based on the command file;

executing the measure command and updating the firmware based on the execution order of the measure command and a patch file related to the measure command; and based on a general firmware update menu being selected, deleting the measure command and the patch file included in the command file and updating the firmware based on the firmware file.

2. The firmware update method according to claim 1, wherein the generating the command table comprises generating a command table comprising at least one item of the related patch file, an execution condition, a number of times of execution, an execution time, or an execution location along with an item of the execution order of measure command, based on the command file.

3. The firmware update method according to claim 2, wherein the execution location includes an area of a booter, a kernel, or an application.

4. The firmware update method according to claim 2, wherein the executing the measure command and updating the firmware comprises, based on the number of times of execution of the measure command included in the command table being more than one, reducing the number of times of execution of the measure command by one, each time that the measure command is executed, and executing the measure command repeatedly until the number of times of execution of the measure command becomes 0.

5. The firmware update method according to claim 1, wherein the executing the measure command and updating the firmware comprises, based on the execution of the measure command being completed, deleting an item related to the measure command included in the command table.

6. The firmware update method according to claim 1, wherein the executing the measure command and updating the firmware comprises, based on the execution of measure command being completed, deleting the patch file related to the measure command.

7. The firmware update method according to claim 1, wherein the measure command comprises a preliminary measure command to be executed before the firmware update or a post-measure command to be executed after the firmware update.

8. The firmware update method according to claim 7, wherein the executing the measure command and updating the firmware comprises, based on the preliminary measure command being a database (DB) clear command, performing a DB clear process based on the DB clear command.

9. The firmware update method according to claim 7, wherein the executing the measure command and updating the firmware comprises, based on the preliminary measure command being a database (DB)-related patch file update command, updating an existing DB-related patch file based on the DB-related patch file update command and the DB-related patch file.

10. The firmware update method according to claim 7, wherein the executing the measure command and updating the firmware comprises, based on the post-measure command being a serial number digit change command, temporarily storing an existing serial number, and storing a new serial number as a serial number of the image forming apparatus.

11. An image forming apparatus comprising:

an input interface; and a processor, wherein the processor is to:

receive a command file input from an external apparatus comprising a measure command, a patch file, and a firmware file for firmware update through the input interface;

receive a selection via a menu of whether to automatically update firmware for the image forming apparatus;

based on the automatic firmware update menu being selected, generate a command table including an execution order of the measure command based on the command file;

based on the command table comprising a preliminary measure command to be executed before the firmware update, execute the measure command and update the firmware based on the execution order of the measure command and a patch file related to the measure command; and based on a general firmware update menu being selected, delete the measure command and the patch file included in the command file and update the firmware based on the firmware file.

12. The image forming apparatus according to claim 11, wherein the processor is to generate a command table comprising at least one of the related patch file, an execution condition, a number of times of execution, an execution time, or an execution location along with an item of the execution order of measure command, based on the command file.

13. The image forming apparatus according to claim 11, further comprising:

a display, wherein the processor is to display a guide user interface (UI) indicating an execution process of the measure command or a process of updating the firmware through the display.

14. A non-transitory computer-readable recording medium on which instructions for executing a firmware update method of an image forming apparatus is recorded, the non-transitory computer-readable recording medium comprising:

instructions to receive a command file input from an external apparatus comprising a measure command, a patch file, and a firmware file for firmware update;

instructions to receive a selection via a menu of whether to automatically update firmware for the image forming apparatus;

instructions to generate a command table comprising an execution order of the measure command based on the command file, based on the automatic firmware update menu being selected;

instructions to execute the measure command and update the firmware based on the execution order of the measure command and the patch file related to the measure command; and instructions to, based on a general firmware update menu being selected, delete the measure command and the patch file included in the command file and update the firmware based on the firmware file.

* * * * *